United States Patent
Zhou et al.

(10) Patent No.: US 9,129,736 B2
(45) Date of Patent: Sep. 8, 2015

(54) TRANSFORMER CAPABLE OF SUPPRESSING COMMON MODE CURRENT AND POWER CONVERTER THEREOF

(75) Inventors: Jin-Ping Zhou, Shanghai (CN); Yi-Cong Xie, Shanghai (CN); Jian-Ping Ying, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 157 days.

(21) Appl. No.: 13/478,834

(22) Filed: May 23, 2012

(65) Prior Publication Data
US 2013/0235619 A1   Sep. 12, 2013

(30) Foreign Application Priority Data

Mar. 6, 2012   (CN) .......................... 2012 1 0057664

(51) Int. Cl.
| | |
|---|---|
| H01F 27/32 | (2006.01) |
| H01F 27/28 | (2006.01) |
| H01F 27/29 | (2006.01) |
| H02M 3/335 | (2006.01) |
| H01F 27/36 | (2006.01) |
| H02M 1/12 | (2006.01) |

(52) U.S. Cl.
CPC .......... *H01F 27/2885* (2013.01); *H01F 27/362* (2013.01); *H01F 27/2823* (2013.01); *H02M 3/335* (2013.01); *H02M 2001/123* (2013.01)

(58) Field of Classification Search
CPC ............. H01F 27/362; H01F 27/2885; H01F 27/2823; H02M 3/335; H02M 2001/123
USPC ....................... 336/84 C, 170–173, 180–186; 363/21.04, 21.01, 20
See application file for complete search history.

(56) References Cited

U.S. PATENT DOCUMENTS

| | | | |
|---|---|---|---|
| 6,549,431 B2 * | 4/2003 | Odell et al. ................ | 363/21.12 |
| 7,346,979 B2 * | 3/2008 | Park ................................ | 29/605 |
| 7,355,871 B2 * | 4/2008 | Odell et al. .................... | 363/13 |
| 7,564,334 B2 * | 7/2009 | Odell et al. ................... | 336/180 |
| 7,768,369 B2 * | 8/2010 | Park ........................... | 336/84 C |
| 7,868,724 B2 | 1/2011 | Sicong et al. | |

FOREIGN PATENT DOCUMENTS

| | | |
|---|---|---|
| CN | 1992106 A | 7/2007 |
| CN | 201622921 U | 11/2010 |
| EP | 1562204 A2 | 8/2005 |

* cited by examiner

*Primary Examiner* — Mangtin Lian
(74) *Attorney, Agent, or Firm* — CKC & Partners Co., Ltd.

(57) ABSTRACT

A transformer capable of suppressing common mode current and a power converter thereof are provided. The transformer comprises a primary winding, a secondary winding, a magnet core and a shielding winding layer. The shielding winding layer has a first shielding winding and a second shielding winding. A voltage jump direction of the first shielding winding is constantly opposite to that of the second shielding winding. The shielding winding layer is coupled to a static terminal coupled with the primary winding or the secondary winding.

17 Claims, 13 Drawing Sheets

TRANSFORMER CAPABLE OF SUPPRESSING COMMON MODE CURRENT AND POWER CONVERTER THEREOF

RELATED APPLICATIONS

This application claims priority to Chinese Application Serial Number 201210057664.2, filed Mar. 6, 2012, which is herein incorporated by reference in its entirety.

BACKGROUND

1. Field of Invention

The present invention relates to a power converter. More particularly, the present invention relates to a transformer structure of the power converter capable of suppressing a common mode current.

2. Description of Related Art

In the prior art, a power converter including a transformer often causes a common mode noise. It is well known that, the transformer includes a primary winding, a magnet core and a secondary winding. In general, parasitic capacitances exist between the primary winding and the secondary winding, between the primary winding and the magnet core, and between the secondary winding and the magnet core. During the operation of the power converter, when a power component is repeatedly turned on or off at a high frequency, a voltage jump occurs in the primary winding and/or the secondary winding of the transformer, the voltage jump causes displacement currents through the aforementioned parasitic capacitances. When the displacement currents flow into the ground, the common mode noise is formed in the power converter.

When a voltage jump occurs in the winding of the transformer, according to the voltage jump condition, the winding terminals of the primary winding and/or the secondary winding are respectively referred to as "a static terminal" and "a jump terminal", and respectively include a primary static terminal, a primary jump terminal and/or a secondary static terminal and a secondary jump terminal. The static terminal is a terminal where a voltage relative to earth ground does not jump or the jump frequency of the voltage relative to earth ground is smaller than the switching frequency. The jump terminal is a terminal where the jump frequency of the voltage relative to earth ground is close to or larger than the switching frequency.

In order to suppress the common mode noise formed in the power converter having the transformer, a conventional solution uses a copper foil layer to shield the common mode current between the primary winding and the secondary winding of the transformer. It is assumed that the number of turns of the primary winding is larger than that of the secondary winding, and when a voltage jump occurs, the voltage jump magnitude of the primary winding is larger than that of the secondary winding. At this time, the common mode noise caused by the voltage jump of the primary winding is dominant. By winding a copper foil shielding layer between the primary winding and the secondary winding, and electrically connecting the copper foil shielding layer to the static terminal of the primary winding (i.e., the primary static terminal), no voltage jump occurs in the copper foil shielding layer, and the electric field generated by the voltage jump of the primary winding is shielded by the shielding layer, thereby reducing the common mode current. However, the copper foil shielding layer can only be used to reduce the common mode current generated by the primary voltage jump or the common mode current generated by the secondary voltage jump, but the common mode current from the primary side to the secondary side, and the common mode current from the secondary side to the primary side cannot be suppressed or balanced essentially. Moreover, the shielding method using the copper foil is hard to be implemented by automatic processing, and the manufacture and winding of the shielding layer are both completed manually, which has disadvantages of high production cost and low efficiency.

In view of this, many in the industry are endeavoring to find ways in which to design a transformer capable of suppressing the common mode current, so as to eliminate one of the disadvantages of using the copper foil shielding layer, to enable the automatic production and reduce the production cost while further reducing the common mode noise.

SUMMARY

In order to solve one of the above disadvantages of a power converter including a transformer for suppressing the common mode current in the prior art, the present invention provides a transformer capable of suppressing the common mode current and a power converter including the transformer.

An aspect of the present invention is to provide a transformer capable of suppressing a common mode current. The transformer includes a primary winding, a secondary winding, a magnet core and a shielding winding layer. The shielding winding layer comprises a first shielding winding and a second shielding winding. The voltage jump direction of the first shielding winding is constantly opposite to that of the second shielding winding. The shielding winding layer is coupled to a static terminal coupled with the primary winding or the secondary winding.

In an embodiment, each physical layer of the shielding winding layer includes the first shielding winding and the second shielding winding.

In an embodiment, the primary winding includes a first primary terminal and a second primary terminal, and the first primary terminal is the static terminal. The first shielding winding includes a first jump terminal and a first static terminal. The second shielding winding includes a second jump terminal and a second static terminal. The first static terminal and the second static terminal are coupled to the first primary terminal.

In an embodiment, the secondary winding includes a first secondary terminal and a second secondary terminal, and the first secondary terminal is the static terminal. The first shielding winding includes a first jump terminal and a first static terminal. The second shielding winding includes a second jump terminal and a second static terminal. The first static terminal and second static terminal are coupled to the first secondary terminal.

In an embodiment, the primary winding includes a first primary terminal and a second primary terminal, and the first primary terminal is a primary jump terminal. The first primary terminal is coupled with the static terminal. The first shielding winding includes a first jump terminal and a first static terminal. The second shielding winding includes a second jump terminal and a second static terminal. The first static terminal and the second static terminal are coupled to the static terminal.

In an embodiment, the secondary winding includes a first secondary terminal and a second secondary terminal, and the first secondary terminal is a secondary jump terminal. The first secondary terminal is coupled with the static terminal. The first shielding winding includes a first jump terminal and a first static terminal. The second shielding winding includes a second jump terminal and a second static terminal. The first static terminal and the second static terminal are coupled to the static terminal.

In an embodiment, the shielding winding layer is connected to the static terminal via a resistance, a capacitor, an inductance or a combination thereof.

In an embodiment, the number of turns of the first shielding winding is greater or smaller than that of the second shielding winding. In another embodiment, the number of turns of the first shielding winding is equal to that of the second shielding winding.

In an embodiment, the first shielding winding and the second shielding winding are arranged in a cross winding or sequential winding manner.

In an embodiment, at least one of the first shielding winding and the second shielding winding in the shielding winding layer is an auxiliary winding of the primary winding.

In an embodiment, at least one of the first shielding winding and the second shielding winding in the shielding winding layer is an auxiliary winding of the secondary winding.

In an embodiment, the first or second shielding winding in the shielding winding layer is a portion of the primary winding.

In an embodiment, the first or second shielding winding in the shielding winding layer is a portion of the secondary winding.

Another aspect of the present invention is to provide a power converter, and the power converter includes the aforementioned transformer.

In an embodiment, the power converter is a forward converter or a flyback converter.

In another embodiment, the power converter is a half-bridge converter or a full-bridge converter.

In the present invention, by using the transformer capable of suppressing the common mode current, there are a first shielding winding and a second shielding winding disposed on the same shielding winding layer. The voltage jump direction of the first shielding winding is constantly opposite to that of the second shielding winding. Thus, the effects of respective electric fields generated by respective voltage jumps of the first shielding winding and the second shielding winding on other windings of the transformer cancel each other out, so as to suppress the common mode current between the primary winding and the secondary winding of the transformer. Moreover, the number of turns of the first shielding winding and that of the second shielding winding can be flexibly adjusted, so as to further reduce the common mode current. Compared with the copper foil shielding layer of the prior art, the shielding winding layer provided by the present invention can be automatically produced, thereby reducing the production cost and improving the production efficiency.

BRIEF DESCRIPTION OF THE DRAWINGS

In order to make the foregoing as well as other aspects, features, advantages, and embodiments of the present invention more apparent, the accompanying drawings are described as follows.

DETAILED DESCRIPTION

Figure 1:
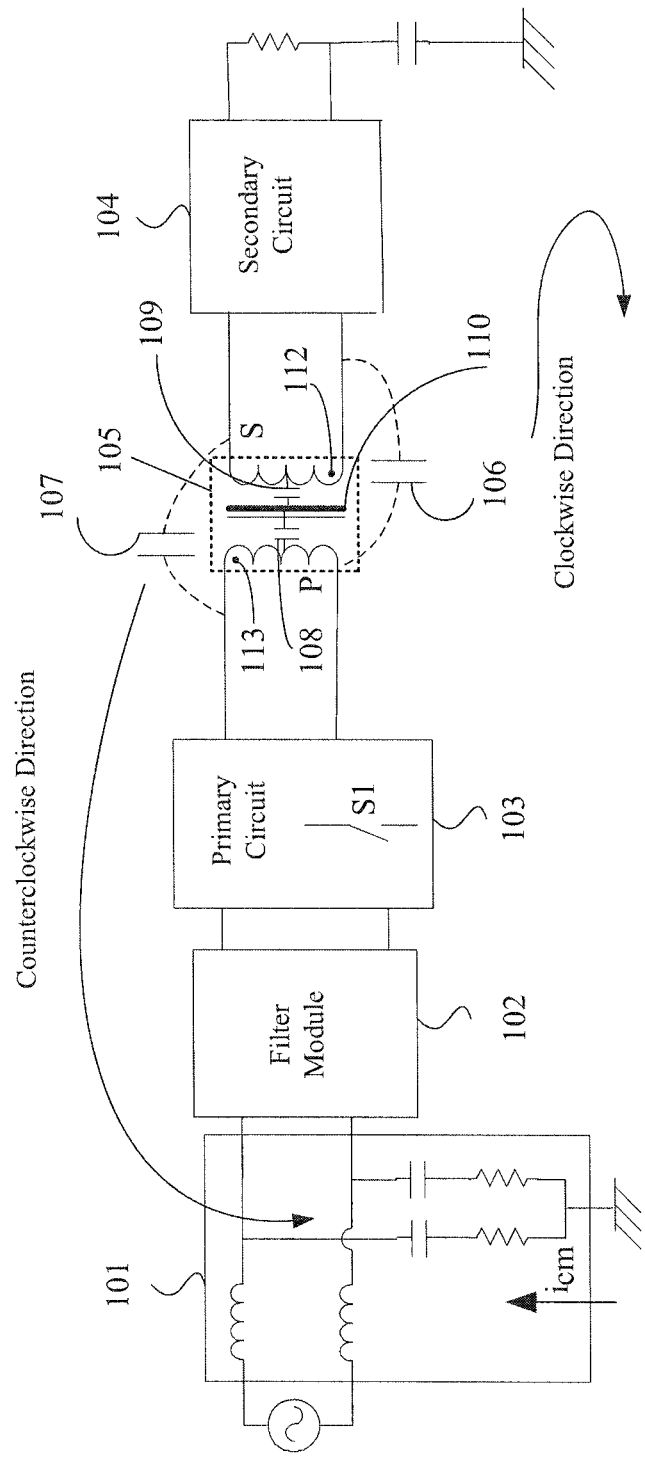
FIG. 1 illustrates a schematic circuit structure diagram showing a common mode current formed between a primary winding and a secondary winding of a transformer included in a power converter.

In order to make the technical contents of the present invention more detailed and more comprehensive, various embodiments of the present invention are described below with reference to the accompanying drawings. Wherever possible, the same reference numbers are used in the drawings and the description to refer to the same or like parts. However, those of ordinary skills in the art should understand that the embodiments described below are not used for limiting the scope of the present invention. Moreover, the accompanying drawings are only illustrative and are not made according to the original size.

In the embodiments of the present invention, the description relating to "coupled with/to" may refer to that a component is indirectly connected to another component through other components, and may also refer to that a component is directly connected to another component without using other components.

Specific implementations in various aspects of the present invention are further described in detail below with reference to the accompanying drawings.

FIG. 1 illustrates a schematic circuit structure diagram showing a common mode current formed between a primary winding and a secondary winding of a transformer included in a power converter. Referring to FIG. 1, the power converter includes a transformer 105, a primary circuit 103, a secondary circuit 104, a filter module 102 and a line impedance stabilizing network (LISN) 101. The primary circuit 103 is connected with the primary winding of the transformer 105. The secondary circuit 104 is connected with the secondary winding of the transformer 105. The LISN 101 is coupled to the primary circuit 103 through the filter module 102. In the topological structure of the power converter, LISN is used as important auxiliary equipment during an electromagnetic compatibility (EMC) test, so as to provide stable load impedance for noise generated by equipment under test (EUT), and to insulate noise from other electronic components.

For the transformer 105 of FIG. 1, the equivalent parasitic capacitance from the primary side to the secondary side is expressed as 106; the equivalent parasitic capacitance from the secondary side to the primary side is represented by reference number 107; the equivalent parasitic capacitance from the primary side to the magnet core 110 of the transformer is represented by reference number 108; and the equivalent parasitic capacitance from the secondary side to the magnet core 110 of the transformer is represented by reference number 109. Since the power component 51 in the primary circuit 103 is turned on and off at a high frequency, a voltage jump occurs in each jump terminal of the primary winding and the secondary winding of the transformer 105. It is assumed that the primary winding of the transformer has a jump terminal P and a static terminal 113, and the secondary winding of the transformer has a jump terminal S and a static terminal 112. As mentioned above, the jump terminal is a terminal on which the jump frequency of the voltage relative to earth ground is close to or greater than the switching frequency of the power component.

When the power component 51 is turned off, it is assumed that a positive voltage jump VP occurs at the primary side of the transformer so as to charge the parasitic capacitance 106, and thus the common mode current is formed in a clockwise direction between the primary side and the secondary side. Meanwhile, in this embodiment, since the secondary jump terminal S and the primary jump terminal P are dotted terminals with each other, the positive voltage jump also occurs in a secondary jump voltage VS so as to charge the parasitic capacitance 107, and thus the common mode current is formed in a counterclockwise direction between the secondary side and the primary side. If the jump voltage VP is much larger than the jump voltage VS (i.e., the jump voltage at the primary side is larger than that at the secondary side), the common mode current in the clockwise direction is much larger than that in the counterclockwise direction, and the positive common mode current icm is detected by the LISN 101, which means that the primary common mode noise source is dominant. Similarly, if the jump voltage VS is much larger than the jump voltage VP (i.e., the jump voltage at the secondary side is larger than that at the primary side), the common mode current in the counterclockwise direction is much larger than that in the clockwise direction, and the negative common mode current icm is detected by the LISN 101, which means that the secondary common mode noise source is dominant.

When the power component 51 is turned on, it is assumed that a negative voltage jump VP occurs at the primary side of the transformer so as to discharge the parasitic capacitance 106, and thus the common mode current is formed in a counterclockwise direction between the secondary side and the primary side. Meanwhile, in this embodiment, a negative jump occurs in the secondary jump voltage VS at the secondary jump terminal S which is the dotted terminal of the primary jump terminal P so as to discharge the parasitic capacitance 107, and thus a common mode current is formed in the clockwise direction between the primary side and the secondary side. If the jump voltage VP is much larger than the jump voltage VS (i.e., the jump voltage at the primary side is larger than that of the secondary side), the common mode current in the counterclockwise direction is much larger than that in the clockwise direction, and the negative common mode current icm is detected by the LISN 101, which means that the primary common mode noise source is dominant. Similarly, if the jump voltage VS is much larger than the jump voltage VP (i.e., the jump voltage at the secondary side is larger than that at the primary side), the common mode current in the clockwise direction is much larger than that in the counterclockwise direction, and the positive common mode current icm is detected by the LISN 101, which means that the secondary common mode noise source is dominant.

In the prior art, in order to suppress the common mode noise between the primary side and the secondary side of the transformer, a copper foil shielding layer is arranged between the primary side and the secondary side of the transformer, so as to shield the common mode current between the primary side and the secondary side. In particularly, when the copper foil shielding layer is connected to the static terminal at the primary side, the equivalent parasitic capacitance 106 from the primary side to the secondary side is reduced, and the common mode noise caused by the primary noise source is reduced significantly, so that the common mode current detected by the LISN mainly comes from the secondary side voltage jump. However, for using the copper foil shielding layer, no matter when the primary common mode noise or the secondary common mode noise is dominant, the copper foil shielding layer can only reduce the common mode current generated by the voltage jump at the primary side or the secondary side, but the common mode current from the primary side to the secondary side of the transformer and the common mode current from the secondary side to the primary side are not suppressed or balanced essentially. Moreover, the shielding method using the copper foil is difficult to be implemented by automatic processing, and the manufacture and winding of the shielding layer are both manually completed, which have disadvantages of high production cost and low efficiency.

Figure 2:
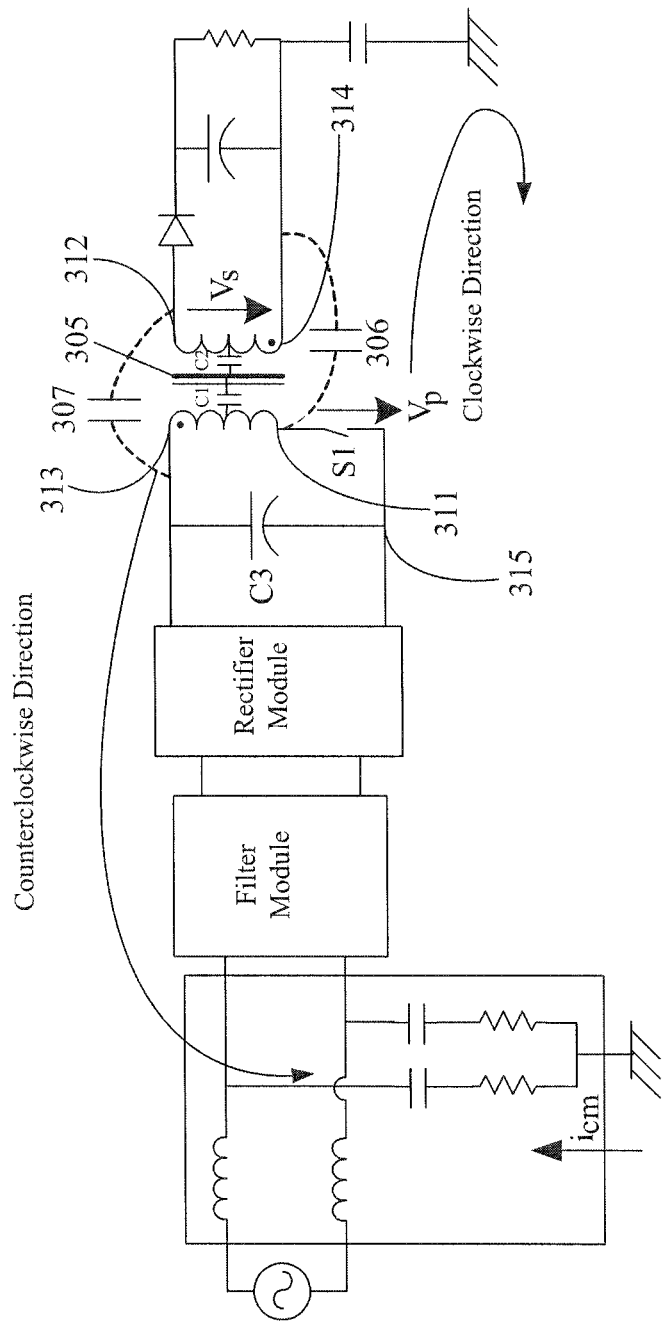
FIG. 2 illustrates a schematic circuit structure diagram showing of the power converter shown in FIG. 1 according to an embodiment.

FIG. 2 illustrates a schematic circuit structure diagram showing the power converter shown in FIG. 1 according to of an embodiment. Referring to FIG. 2, the circuit is a flyback converter topology, and the primary circuit 103 includes a rectifier module, a bus capacitance C3 and a power component S1 connected in series with the primary winding 103. The transformer includes the primary winding and the secondary winding. The primary winding has a first primary terminal 311 and a second primary terminal 313. The first primary terminal 311 is a primary jump terminal, and the second primary terminal 313 is a static terminal. However, in some embodiments, a node 315 of the bus capacitance C3 may be arranged as a static terminal, and the second primary terminal 313 is coupled to the node 315. Similarly, the secondary winding has a first secondary terminal 312 and a second secondary terminal 314, and the first secondary terminal 312 is a secondary jump terminal. The primary jump terminal 311 and the secondary jump terminal 312 are dotted terminals with each other. Similar to FIG. 1, in FIG. 2, between the primary side and the secondary side the transformer includes the equivalent parasitic capacitance 306 from the primary side to the secondary side, the equivalent parasitic capacitance 307 from the secondary side to the primary side, the equivalent parasitic capacitance C1 from the primary side to the magnet core 305 of the transformer, and the equivalent parasitic capacitance C2 from the secondary side to the magnet core 305 of the transformer. When the power component 51 is turned off, the positive voltage jump occurs in the primary jump voltage VP (i.e., the jump voltage at the point 311), and thus the common mode current in the clockwise direction is formed by the parasitic capacitance 306. Moreover, since the jump terminal of the secondary winding and the jump terminal of the primary winding are dotted terminals with each other, the positive voltage jump occurs in the jump voltage VS of the secondary winding (i.e., the jump voltage at the point 312), and the common mode current in the counterclockwise direction is formed by the parasitic capacitance 307.

Different from the prior art, in order to suppress the common mode current between the primary side and the secondary side of the transformer, the power converter of the present invention has a shielding winding layer structure at the transformer part. The shielding winding layer has two shielding windings, and the voltage jump direction of one shielding winding is constantly opposite to that of the other shielding winding, so as to achieve balance of the common mode noise in the overall power converter circuit.

Those skilled in the art should understand that, although the flyback converter in FIG. 2 is an exemplary embodiment of the power converter, wherein the cause of the common mode current and the common mode noise is described, the power converter of the present invention is not limited to thereto. For example, in other specific embodiments, the power converter may further be a forward converter, a half-bridge converter or a full-bridge converter. It should be understood that the principle of the forward converter and the half-bridge converter for eliminating the common mode noise is the same as or similar to that of the flyback converter. Moreover, for purpose of simplicity, it is not further illustrated herein any more. For the full-bridge converter, the related technical details for achieving balance of the common mode noise in the circuit through the shielding winding layer structure is described in detail in the following paragraphs.

In a specific embodiment, the primary winding of the power converter includes a first primary terminal and a second primary terminal, and the second primary terminal is a static terminal (also referred to as the primary static terminal, such as the terminal 313 shown in FIG. 2). One shielding winding of the shielding winding layer includes a first jump terminal and a first static terminal, and the other shielding winding of the shielding winding layer includes a second jump terminal and a second static terminal. The first static terminal and the second static terminal are coupled to the second primary terminal. Furthermore, the secondary winding includes a first secondary terminal and a second secondary terminal. In some embodiments, the first secondary terminal is the secondary jump terminal, and the second secondary terminal is the secondary static terminal. In some embodiments, the first secondary terminal and the second secondary terminal are both secondary jump terminals.

In a specific embodiment, the secondary winding of the power converter includes a first secondary terminal and a second secondary terminal, and the first secondary terminal is the static terminal (also referred to as the secondary static terminal). One shielding winding of the shielding winding layer includes a first jump terminal and a first static terminal, and the other shielding winding of the shielding winding layer includes a second jump terminal and the second static terminal. The first static terminal and the second static terminal are coupled to the first secondary terminal. Furthermore, the primary winding includes a first primary terminal and a second primary terminal. In some embodiments, the first primary terminal is the primary jump terminal, and the second primary terminal is the primary static terminal. In some embodiments, the first primary terminal and the second primary terminal are both primary jump terminals.

In a specific embodiment, the primary winding of the power converter includes a first primary terminal and a second primary terminal. The first primary terminal is the primary jump terminal, and the first primary terminal is coupled to a static terminal (such as the static terminal 315 shown in FIG. 2). For example, the first primary terminal of the primary winding is connected to the static terminal by a switch or diode which is turned on or off at a switching frequency. One shielding winding of the shielding winding layer includes a first jump terminal and a first static terminal, and the other shielding winding of the shielding winding layer includes a second jump terminal and a second static terminal. The first static terminal and the second static terminal are coupled to the static terminal. Furthermore, the secondary winding includes a first secondary terminal and a second secondary terminal. In some embodiments, the first secondary terminal is the secondary jump terminal, and the second secondary terminal is the secondary static terminal. In some embodiments, the first secondary terminal and the second secondary terminal are both secondary jump terminals.

In a specific embodiment, the secondary winding of the power converter includes a first secondary terminal and a second secondary terminal. The first secondary terminal is the secondary jump terminal, and the first secondary terminal is coupled to a static terminal. For example, the first secondary terminal of the secondary winding is connected to the static terminal by a switch or diode which is turned on or off at a switching frequency. One shielding winding of the shielding winding layer includes a first jump terminal and a first static terminal, and the other shielding winding of the shielding winding layer includes a second jump terminal and a second static terminal. The first static terminal and the second static terminal are coupled to the static terminal. Furthermore, the primary winding includes a first primary terminal and a second primary terminal. In some embodiments, the first primary terminal is the primary jump terminal, and the second primary terminal is the primary static terminal. In some embodiments, the first primary terminal and the second primary terminal are both primary jump terminals.

Figure 3:
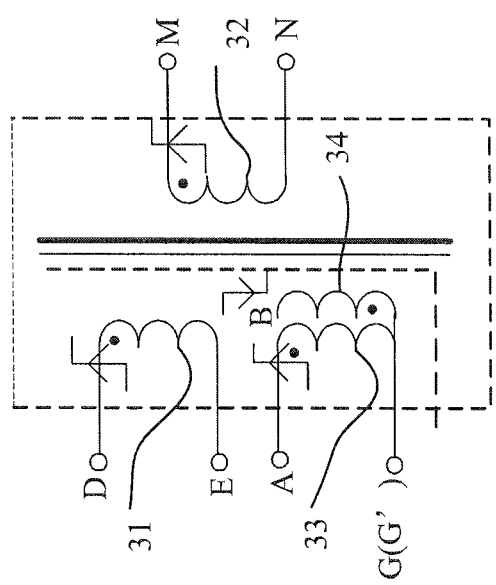
FIG. 3 illustrates a schematic circuit structure diagram showing a transformer capable of suppressing the common mode current according to an embodiment of the present invention.

In the present invention, in order to illustrate the principle of achieving balance of the common mode noise based on the shielding winding layer in details, FIG. 3 illustrates a schematic structure diagram showing the transformer capable of suppressing the common mode current according to of an embodiment. Referring to FIG. 3, the primary winding 31 includes a first primary terminal D (or referred to as the primary jump terminal D) and a second primary terminal (or referred to as the primary static terminal E). The secondary winding 32 includes a first secondary terminal M (or referred to as the secondary jump terminal M) and a second secondary terminal N (or referred to as the secondary static terminal N). The primary jump terminal D and the secondary jump terminal M are dotted terminals with each other.

It should be pointed out that, the shielding winding layer includes a first shielding winding 33 and a second shielding winding 34. The first shielding winding 33 includes a jump terminal A and a static terminal G. The second shielding winding 34 includes the jump terminal B and the static terminal G'. It can be seen from FIG. 3 that, when a positive jump occurs in the primary jump terminal D of the primary winding 31 (as shown by the arrow), in the first shielding winding 33 the voltage jump direction of the jump terminal A is the same as that of the primary jump terminal D, and in the second shielding winding 34 the voltage jump direction of the jump terminal B is opposite to that of the primary jump terminal D. That is, the two shielding windings 33 and 34 on the shielding winding layer are constantly opposite due to the opposite voltage jump directions, so that when the power component S1 is turned on or off, the voltage jump direction of one shielding winding is constantly the same as that of the primary winding 31, and the voltage jump direction of the other shielding winding is opposite to that of the primary winding 31.

Those skilled in the art should understand that, when the primary common mode noise is dominant, the static terminals G and G' of the shielding windings 33 and 34 in FIG. 3 are respectively coupled to the primary static terminal E of the primary winding 31. When the secondary common mode noise is dominant, the static terminals G and G' of the shielding windings 33 and 34 in FIG. 3 are respectively coupled to the secondary static terminal N of the secondary winding 32.

In a specific embodiment, the number of turns of the primary winding 31 is N1 and the number of turns of the secondary winding 32 is N2, when N1 is greater than N2, the static terminals of the shielding windings 33 and 34 on the shielding winding layer are coupled to the primary static terminal E, wherein N1 and N2 are natural numbers.

Figure 4A:
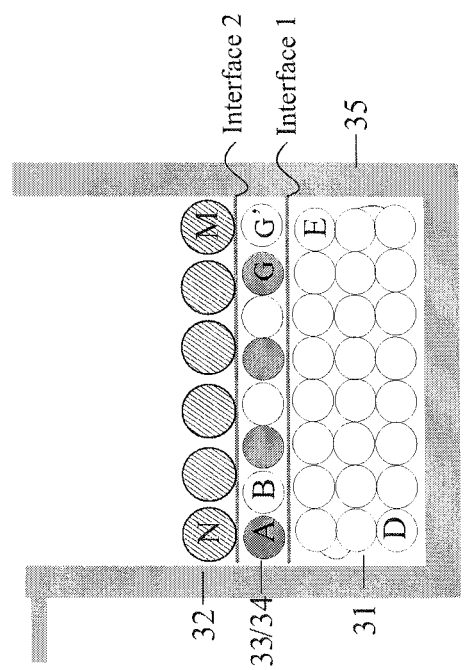
FIG. 4A illustrates a schematic structure diagram in which on the shielding winding layer of the transformer in FIG. 3, the first shielding winding and the second shielding winding have the same number of turns and are wound in a cross manner.
Figure 4B:
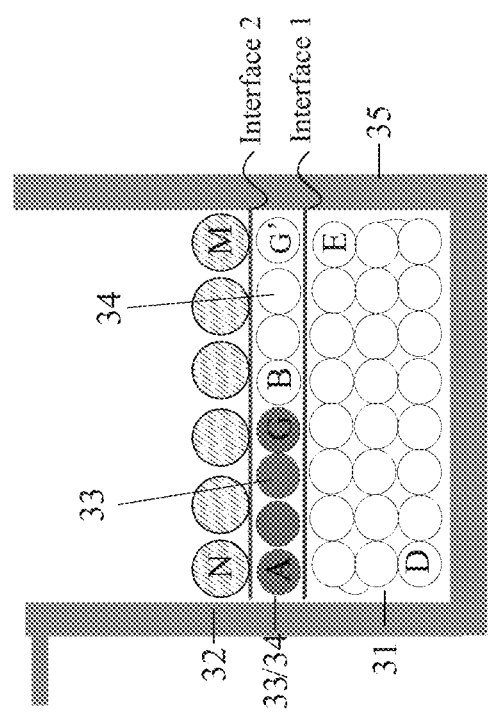
FIG. 4B illustrates a schematic structure diagram in which on the shielding winding layer of the transformer in FIG. 3, the first shielding winding and the second shielding winding have the same number of turns and are wound in a sequential manner.

FIG. 4A illustrates a schematic structure diagram in which on the shielding winding layer of the transformer in FIG. 3, the first shielding winding and the second shielding winding have the same number of turns and are wound in a cross manner. FIG. 4B illustrates a schematic structure diagram in which on the shielding winding layer of the transformer in FIG. 3, the first shielding winding and the second shielding winding have the same number of turns and are winded in a sequential manner.

Referring to FIG. 4A, when the power component in the power converter is turned on or off, the common mode current at interface 1 from the voltage jump occurring in the primary winding 31 of the transformer to the secondary winding 32 is shielded by the two shielding windings 33 and 34 on the shielding winding layer. Moreover, since the voltage jump directions of respective jump terminals A and B of the shielding windings 33 and 34 are constantly opposite to each other, when the shielding windings 33 and 34 have the same number of turns, no additional common mode current at the interface 2 from the shielding windings 33 and 34 to the secondary winding 32 is generated. Thus, the common mode current between the primary winding 31 and the secondary winding 32 is shielded by the shielding winding layer.

In FIG. 4A, the shielding windings 33 and 34 are wound in a cross manner. That is, the shielding winding 33 is represented by a black circle, the shielding winding 34 is represented by a white circle, and the black and white circles are alternatively arranged on the shielding winding layer.

Referring to FIG. 4B, similar to 4A, a shielding winding layer is arranged between the primary winding 31 and the secondary winding 32. The shielding winding layer has shielding windings 33 and 34. The voltage jump direction of the shielding winding 33 is constantly opposite to that of the shielding winding 34. However, in FIG. 4B the shielding windings 33 and 34 are wound in a sequential manner. For example, the shielding winding 33 is represented by a black circle, the shielding winding 34 is represented by a white circle, and the black and white circles are sequentially arranged, which means that on the shielding winding layer, the shielding winding 33 is first wound, and subsequently the shielding winding 34 is wound.

Figure 4C:
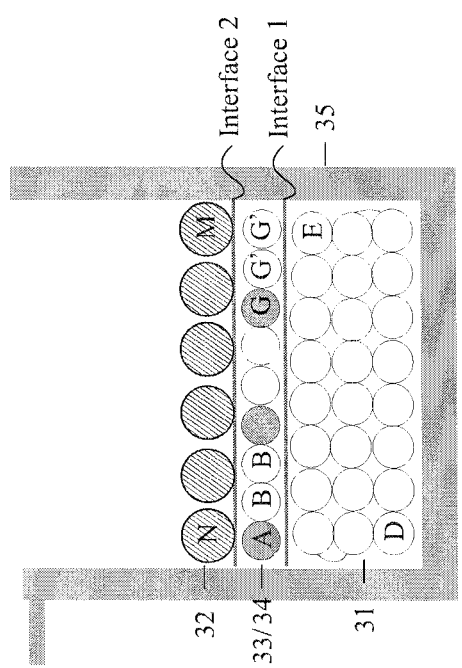
FIG. 4C illustrates a schematic structure diagram in which on the shielding winding layer of the transformer in FIG. 3, the number of turns of the first shielding winding is smaller than that of the second shielding winding, and the first shielding winding and the second shielding winding are both wound in a cross manner.
Figure 4D:
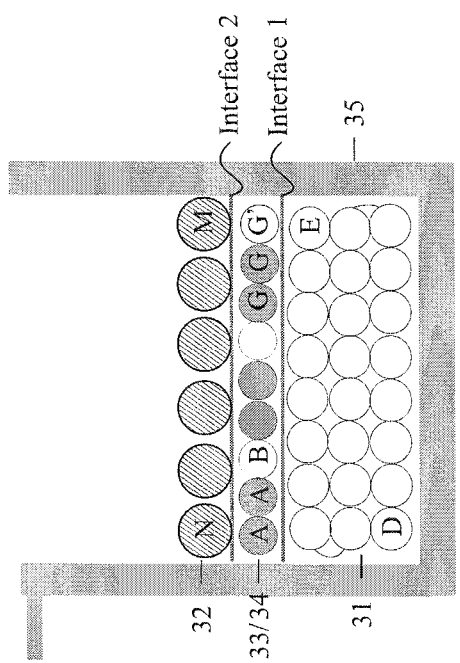
FIG. 4D illustrates a schematic structure diagram in which on the shielding winding layer of the transformer in FIG. 3, the number of turns of the first shielding winding is greater than that of the second shielding winding, and the first shielding winding and the second shielding winding are both wound in a cross manner.

FIG. 4C illustrates a schematic structure diagram in which on the shielding winding layer of the transformer in FIG. 3 the number of turns of the first shielding winding is smaller than that of the second shielding winding, and the first and second shielding windings are wound in a cross manner. FIG. 4D illustrates a schematic structure diagram in which on the shielding winding layer of the transformer in FIG. 3 the number of turns of the first shielding winding is greater than that of the second shielding winding, and the first and second shielding windings are wound in a cross manner.

Referring to FIG. 4C, if the voltage jump direction of the jump terminal A of the first shielding winding 33 is the same as that of the jump terminal D of the primary winding 31, and the voltage jump direction of the jump terminal B of the second shielding winding 34 is opposite to that of the jump terminal D of the primary winding 31, respective static terminals G and G' of the shielding windings 33 and 34 are electrically connected to the static terminal of the primary winding 31 directly or by a low impedance (such as the resistance, the capacitance, the inductance or a combination thereof). At this time, the common mode current from the primary winding 31 to the secondary winding 32 is shielded by the shielding winding layer. However, the distribution current flowing from the primary winding 31 through the magnet core 35 of the transformer to the secondary winding 32, and the distribution current flowing from the secondary winding 32 to the primary shielding windings 33 and 34 still exist, which cannot ensure that the total common mode current between the primary side and the secondary side of the overall transformer is 0. If the first shielding winding 33 and the second shielding winding 34 have the same number of turns, when the distribution current flowing from the primary winding 31 through the magnet core 35 of the transformer into the secondary winding 32 is dominant, on the shielding winding layer the number of turns of the second shielding winding 34 is arranged to be greater than that of the first shielding winding 33, so as to increase the common mode current from the secondary winding 32 to the primary shielding windings 33 and 34 at the interface 2 and further to eliminate the common mode noise flowing from the primary winding 31 through the magnet core 35 of the transformer into the secondary winding 32, such that the common mode current between the primary side and the secondary side close to the balance. That is, the common mode current in the clockwise direction is nearly equal to that in the counterclockwise direction.

Similarly, referring to FIG. 4D, if the first shielding winding 33 and the second shielding winding 34 have the same number of turns, and the common mode noise from the secondary winding 32 to the primary shielding windings 33 and 34 is still dominant, on the shielding winding layer of the present invention the number of turns of the first shielding winding 33 is arranged to be greater than that of the second shielding winding 34, so as to reduce the common mode noise from the secondary winding 32 to the primary shielding windings 33 and 34 at the interface 2, such that the common mode current between the primary side and the secondary side is closer to balance. It can be seen that, in the transformer capable of suppressing the common mode current of the present invention, respective numbers of turns of the first shielding winding 33 and the second shielding winding 34 on the shielding winding layer can be flexibly regulated, so as to further balance the common mode noise between the primary side and the secondary side compared with the copper foil shielding manner of the prior art.

In other embodiments, if the number of turns N1 of the primary winding 31 is smaller than the number of turns N2 of the secondary winding 32, the static terminals of the shielding windings 33 and 34 on the shielding winding layer are coupled to the secondary static terminal N directly or by a low impedance (such as the resistance, the capacitance, the inductance or a combination thereof), wherein N1 and N2 are both natural numbers. If the number of turns N1 of the primary winding 31 is equal to the number of turns N2 of the secondary winding 32, the static terminals of the shielding windings 33 and 34 on the shielding winding layer are coupled to the primary static terminal E or the secondary static terminal N directly or by a low impedance (such as the resistance, the capacitance, the inductance or a combination thereof), wherein N1 and N2 are both natural numbers.

Figure 5:
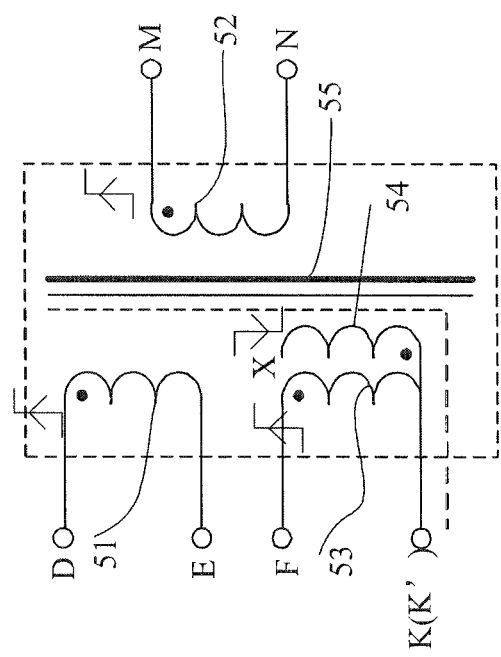
FIG. 5 illustrates a schematic circuit structure diagram showing a transformer capable of suppressing the common mode current according to an embodiment of the present invention.
Figure 6:
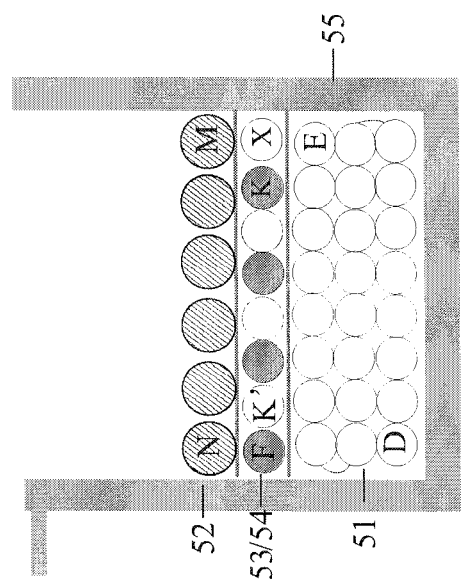
FIG. 6 illustrates a schematic structure diagram in which the shielding winding layer of the transformer in FIG. 5 are wound in a cross manner.

FIG. 5 illustrates a schematic structure diagram showing the transformer capable of suppressing the common mode current according to an embodiment of the present invention. FIG. 6 illustrates a schematic structure diagram in which the shielding winding layer of the transformer in FIG. 5 is wound in a cross manner.

Referring to FIG. 5, the primary winding includes a principal winding 51 and an auxiliary winding 53. The principal winding 51 includes a first primary terminal D (i.e., the primary jump terminal D) and a second primary terminal E (i.e., the primary static terminal E). The auxiliary winding 53 includes a jump terminal F and a static terminal K. The secondary winding 52 includes a first secondary terminal M (i.e., the secondary jump terminal M) and a second secondary terminal N (i.e., the secondary static terminal N). The secondary jump terminal M, the primary jump terminal D of the principal winding 51 and the jump terminal F of the auxiliary winding 53 are dotted terminals with each other.

It should be pointed out that, the shielding winding layer includes a shielding winding 54. The shielding winding 54 includes a jump terminal X and a static terminal K'. At the same time, the primary auxiliary winding 53 is also arranged on the shielding winding layer as another shielding winding, and the voltage jump direction of the shielding winding 54 is constantly opposite to that of the auxiliary winding 53. That is, in this specific embodiment, on the shielding winding layer, it is only needed to add the additional shielding winding 54, so as to regard the primary auxiliary winding 53 as another shielding winding on the shielding winding layer, such that a shielding winding layer constantly having an opposite voltage jump direction is formed, and the common mode current between the primary side and the secondary side of the transformer is close to the balance. In FIG. 5, the common mode noise from the primary side to the secondary side is dominant, and thus respective static terminals K' and K of the shielding winding 54 and the auxiliary winding 53 on the shielding winding layer is coupled to the primary static terminal E of the primary principal winding 51. In other embodiments, the common mode noise from the secondary side to the primary side is dominant, and the secondary winding includes a principal winding and an auxiliary winding. At this time, the shielding winding layer of the transformer uses the secondary auxiliary winding as a shielding winding.

It can be seen from FIG. 5 that, when a positive jump occurs in the primary jump terminal D of the primary principal winding 51 (as shown by the arrow), in the auxiliary winding 53 the voltage jump direction of the jump terminal F is the same as that of the jump terminal D, and in the shielding winding 54 the voltage jump direction of the jump terminal X is opposite to that of the primary jump terminal D. That is, the two shielding windings 53 and 54 on the shielding winding layer are constantly opposite due to the opposite voltage jump directions, so that when the power component S1 is turned on or off, the voltage jump direction of one shielding winding is constantly the same as that of the primary principal winding, and the voltage jump direction of the other shielding winding is opposite to that of the primary principal winding.

In a specific embodiment, the two static terminals K and K' on the shielding winding layer are directly connected to the primary static terminal E of the primary principal winding or the secondary static terminal N. Alternatively, the shielding winding layer is connected to the primary static terminal E or the secondary static terminal N via a resistance, a capacitance, an inductance or a combination thereof.

In a specific embodiment, the number of turns of the shielding winding 54 is greater or smaller than that of the auxiliary winding 53. For example, when the number of turns of the shielding winding 54 is greater than that of the auxiliary winding 53, the common mode noise from the primary side to the secondary side can be further eliminated, such that the common mode current between the primary side and the secondary side is close to the balance. That is, the common mode current in the clockwise direction is nearly equal to that in the counterclockwise direction. Moreover, when the number of turns of the shielding winding 54 is smaller than that of the auxiliary winding 53, the common mode noise from the secondary side to the primary side can be further eliminated, such that the common mode current between the primary side and the secondary side is close to the balance. In another specific embodiment, the number of turns of the shielding winding 54 is equal to that of the auxiliary winding 53.

In a further specific embodiment, when the primary winding includes two or more auxiliary windings, and the common mode noise from the primary side to the secondary side is dominant, the two auxiliary windings in the primary winding are respectively regarded as the first shielding winding and the second shielding winding of the shielding winding layer. Since the voltage jump direction of the first shielding winding is constantly opposite to that of the second shielding winding, the common mode current between the primary side and the secondary side is closer to the balance.

In still a further specific embodiment, when the secondary winding includes two or more auxiliary windings, and the common mode noise from the secondary side to the primary side is dominant, the two auxiliary windings in the secondary winding are respectively regarded as the first shielding winding and the second shielding winding of the shielding winding layer. Since the voltage jump direction of the first shielding winding is constantly opposite to that of the second shielding winding, the common mode current between the secondary side and the primary side is closer to the balance.

Similar to FIGS. 4A and 4B, the shielding winding 54 and the auxiliary winding 53 on the shielding winding layer of this specific embodiment are wound in a cross manner (as shown in FIG. 6) or in a sequential manner.

Figure 7:
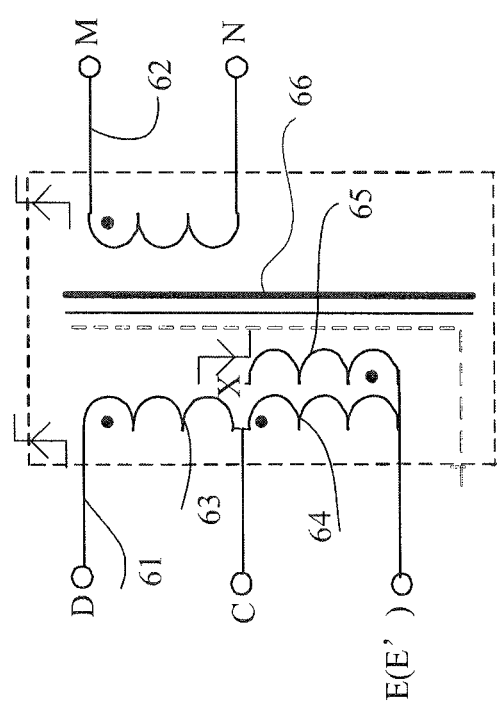
FIG. 7 illustrates a schematic circuit structure diagram showing a transformer capable of suppressing the common mode current according to an embodiment of the present invention.
Figure 8:
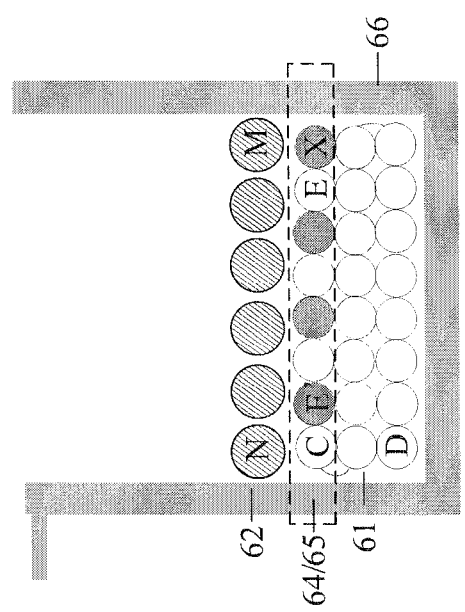
FIG. 8 illustrates a schematic structure diagram in which the shielding winding layer of the transformer in FIG. 7 are wound in a cross manner.

FIG. 7 illustrates a schematic circuit diagram showing the transformer capable of suppressing the common mode current according to an embodiment of the present invention. FIG. 8 illustrates a schematic structure diagram in which the shielding winding layer of the transformer in FIG. 7 is wound in a cross manner.

Referring to FIG. 7, the primary winding 61 includes a center node C, the winding parts 63 and 64. The winding part 63 has a jump terminal D, and the winding part 64 has a jump terminal C and a static terminal E. The secondary winding 62 has the secondary jump terminal M and the secondary static terminal N. The secondary jump terminal M, the jump terminal D of the winding part 63 and the jump terminal C of the winding part 64 are dotted terminals with each other.

It should be pointed out that, the shielding winding layer includes a shielding winding 65. The shielding winding 65 includes a jump terminal X and a static terminal E'. At the same time, the winding part 64 of the primary winding 61 is arranged on the shielding winding layer as another shielding winding, and the voltage jump direction of the jump terminal C of the winding part 64 is constantly opposite to that of the jump terminal X of the shielding winding 65. That is, in this specific embodiment, on the shielding winding layer, it is only needed to add the additional shielding winding 65, so as to regard a portion of the primary winding (i.e., the winding part 64) as another shielding winding on the shielding winding layer, such that a shielding winding layer constantly having an opposite voltage jump direction is formed, and the common mode current between the primary side and the secondary side of the transformer is close to the balance. In FIG. 7, the common mode noise from the primary side to the secondary side is dominant, and thus on the shielding winding layer the static terminal E' of the shielding winding 65 is connected with the static terminal E of the winding part 64 at the primary side. It can be seen from FIG. 7 that, when a positive jump occurs in the jump terminal D of the winding part 63 of the primary winding 61 (as shown by the arrow), in the winding part 64 the voltage jump direction of the jump terminal C is the same as that of the jump terminal D, and in the shielding winding 65 the voltage jump direction of the jump terminal X is opposite to that of the jump terminal D. That is, the two shielding windings 64 and 65 on the shielding winding layer are constantly opposite due to the opposite voltage jump directions, so that when the power component S1 is turned on or off, the voltage jump direction of one shielding winding is the same as that of the winding part 63 of the primary winding, and the voltage jump direction of the other shielding winding is opposite to that of the winding part 63 of the primary winding.

In FIG. 7, since the shielding structure on the shielding winding layer is formed by the winding part 64 of the primary winding 61 and the additionally added shielding winding 65, when the power component in the power converter is turned on or off, due to the voltage jump, the distribution current flowing from the winding part 63 of the primary winding 61 to the secondary winding 62 is shielded by the shielding winding layer, and thus the common mode current from the primary side to the secondary side is reduced, so as to suppress the common mode noise of the total power converter, specifically of the transformer part.

Those skilled in the art should understand that, when the voltage jump magnitude of the primary winding 61 is greater than that of the secondary winding 62, the common mode noise at the primary side is dominant, and thus a portion of the primary winding 61 (i.e., the winding part 64) is regarded as the second shielding winding on the shielding winding layer. A double shielding winding structure is formed by the winding part 64 and the additionally added shielding winding 65. The shielding winding layer is coupled to the static terminal at the primary side. Furthermore, when the voltage jump magnitude of the primary winding is smaller than that of the secondary winding, a portion of the secondary winding is regarded as the second shielding winding on the shielding winding layer. The shielding structure on the shielding winding layer is formed by the second shielding winding and the additionally added shielding winding. The shielding winding layer is coupled to the static terminal at the secondary side.

In a specific embodiment, In order to better balance the common mode noise between the primary side and the second side of the transformer, the number of turns of the additionally added shielding winding 65 is arranged to be greater or smaller than that of the winding part 64 of the primary winding 61. In another specific embodiment, number of turns of the additionally added shielding winding 65 is arranged to be equal to that of the winding part 64 of the primary winding 61. For example, the position of the center tap in the primary winding 61 may be varied to adjust the number of turns of the winding part 64.

Similar to FIGS. 4A and 4B, the shielding winding 64 and the auxiliary winding 65 on the shielding winding layer of this specific embodiment are wound in a cross manner (as shown in FIG. 8) or in a sequential manner.

Figure 9:
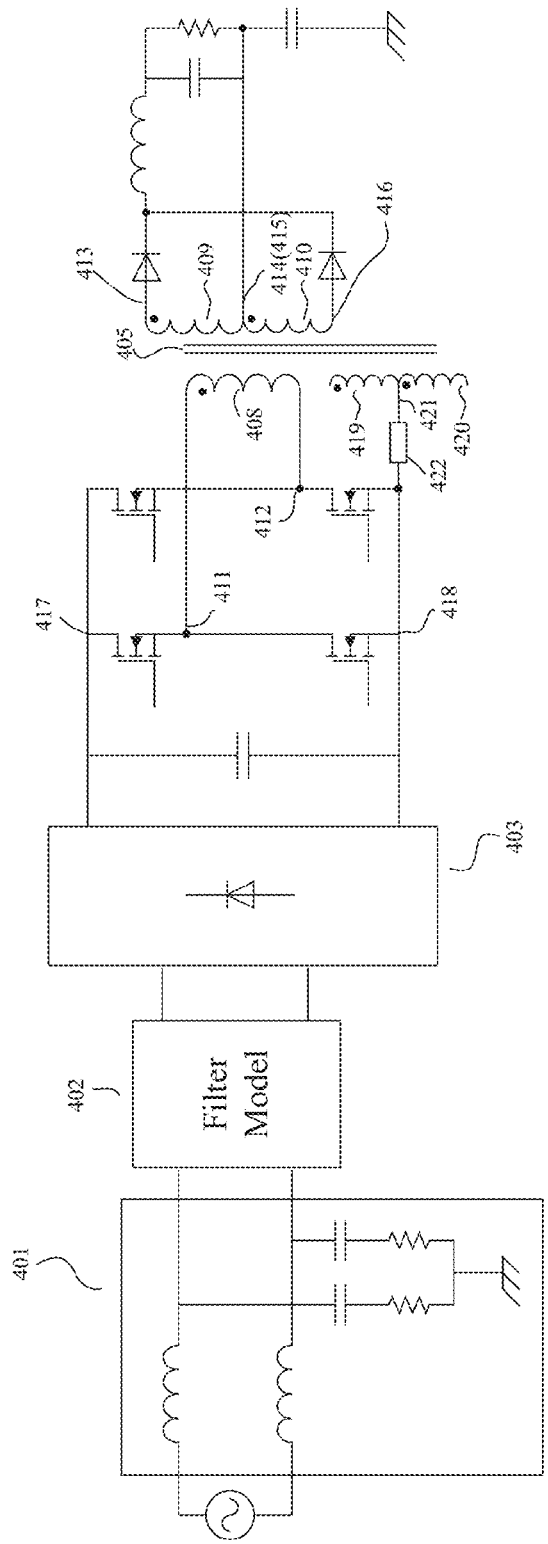
FIG. 9 illustrates a schematic circuit diagram showing a transformer capable of suppressing the common mode current according to an embodiment of the present invention.

FIG. 9 illustrates a schematic circuit diagram showing the transformer capable of suppressing the common mode current according to an embodiment of the present invention. Referring to FIG. 9, the circuit is a full-bridge circuit topology, reference number 401 represents LISN; reference number 402 represents an electromagnetic interference (EMI) filter; reference number 403 represents a diode rectifier bridge; reference number 408 represents the primary winding of the transformer; reference numbers 409 and 410 represent secondary windings of the transformer; reference numbers 411 and 412 represent two terminals of the primary winding (also referred to as the first primary terminal and the second primary terminal) and are respectively coupled to the midpoint of the first bridge arm and the midpoint of the second bridge arm; and reference numbers 413, 414, 415 and 416 represent four terminals of the secondary winding of the transformer. Reference numbers 417 and 418 represent a positive bus terminal and a negative bus terminal coupled to the bus capacitance of the diode rectifier bridge 403, and are both static terminals that coupled to the primary winding 408.

Reference number 419 represents the first shielding winding layer of the transformer. Reference number 420 represents the second shielding winding layer of the transformer.

Figure 10:
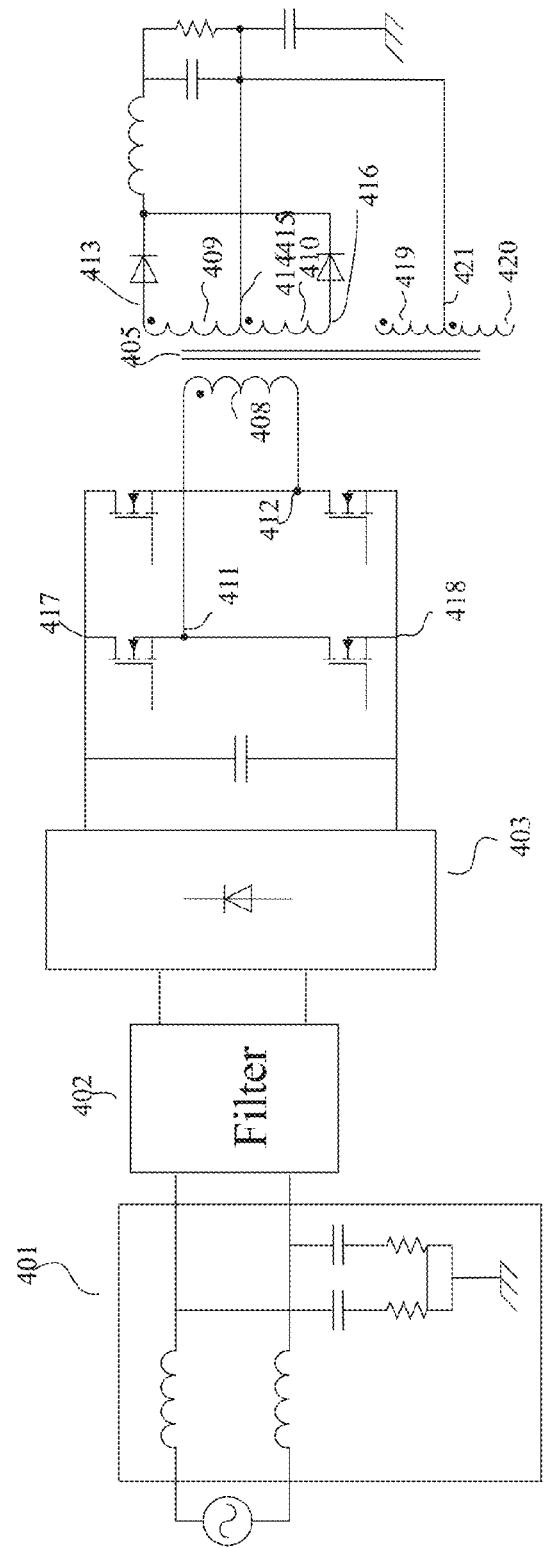
FIG. 10 illustrates a schematic circuit diagram showing a transformer capable of suppressing the common mode current according to another embodiment of the present invention.

It should be pointed out that, since the two terminals 411 and 412 of the primary winding of the transformer are respectively coupled to the midpoints of the two bridge arms (i.e., a node between the upper bridge arm and the lower bridge arm of each bridge arm), the terminals 411 and 412 are both voltage jump terminals. In a specific embodiment, in order to shield the common mode noise at the primary side of the transformer, the common static terminal 421 of the first shielding winding layer 419 and the second shielding winding layer 420 of the transformer is coupled to the static terminals 417 and 418 through a impedance 422 (such as the resistance, the capacitance, the inductance or a combination thereof), in which the static terminals 417 and 418 are coupled to the primary winding. In another specific embodiment, as shown in FIG. 10, each terminal of the secondary winding of the transformer is coupled to the rectifier circuit. In order to shield the common mode noise at the secondary side of the transformer, the common static terminal 421 of the first shielding winding 419 and the second shielding winding 420 of the transformer is connected to the static terminal of the rectifier circuit that coupled to the secondary winding.

In the present invention, by using the transformer capable of suppressing the common mode current, the shielding winding layer has a first shielding winding and a second shielding winding. The voltage jump direction of the first shielding winding is constantly opposite to that of the second shielding winding. Thus, the effects of respective electric fields generated by each voltage jump at the first shielding winding and the second shielding winding on other windings of the transformer cancel each other out, so as to suppress the common mode current between the primary winding and the secondary winding of the transformer. Moreover, the number of turns of the first shielding winding and the second shielding winding can be flexibly adjusted, so as to further reduce the common mode current. Compared with the copper foil shielding layer of the prior art, the shielding winding layer provided by the present invention can be automatically produced, thereby reducing the production cost and improving the production efficiency.

Although the present invention has been disclosed with reference to the above embodiments, these embodiments are not intended to limit the present invention. It will be apparent to those skilled in the art that various modifications and variations can be made without departing from the spirit and scope of the present invention. Therefore, the scope of the present invention shall be defined by the appended claims.

What is claimed is:

1. A transformer capable of suppressing a common mode current, comprising:
    a primary winding coupled to a primary side of the transformer;
    a secondary winding coupled to a secondary side of the transformer;
    a magnet core; and
    a shielding winding layer comprising a first shielding winding and a second shielding winding, wherein both the first shielding winding and the second shielding winding are coupled to the primary side or the secondary side, and the shielding winding layer is arranged between the primary winding and the secondary winding, and the first shielding winding comprises a first jump terminal and a first static terminal, and the second shielding winding comprises a second jump terminal and a second static terminal, and a voltage jump direction of the first jump terminal of the first shielding winding is constantly opposite to that of the second jump terminal of the second shielding winding,
    wherein the first static terminal and the second static terminal are coupled to a static terminal that is coupled with the primary winding or the secondary winding, and the first jump terminal and the second jump terminal are not connected together.

2. The transformer of claim 1, wherein each layer of the shielding winding layer comprises the first shielding winding and the second shielding winding.

3. The transformer of claim 1, wherein the primary winding comprises a first primary terminal and a second primary terminal, and the first primary terminal is the static terminal; the first shielding winding comprises a first jump terminal and a first static terminal; the second shielding winding comprises a second jump terminal and a second static terminal; and the first static terminal and the second static terminal are coupled to the first primary terminal.

4. The transformer of claim 1, wherein the secondary winding comprises a first secondary terminal and a second secondary terminal, and the first secondary terminal is the static terminal; the first shielding winding comprises a first jump terminal and a first static terminal; the second shielding winding comprises a second jump terminal and a second static terminal; and the first static terminal and the second static terminal are coupled to the first secondary terminal.

5. The transformer of claim 1, wherein the primary winding comprises a first primary terminal and a second primary terminal, the first primary terminal is a primary jump terminal, and the first primary terminal is coupled with the static terminal; the first shielding winding comprises a first jump terminal and a first static terminal; the second shielding winding comprises a second jump terminal and a second static terminal; and the first static terminal and the second static terminal are coupled to the static terminal.

6. The transformer of claim 1, wherein the secondary winding comprises a first secondary terminal and a second secondary terminal, and the first secondary terminal is a secondary jump terminal; the first secondary terminal is coupled with the static terminal; the first shielding winding comprises a first jump terminal and a first static terminal; the second shielding winding comprises a second jump terminal and a second static terminal; and the first static terminal and the second static terminal are coupled to the static terminal.

7. The transformer of claim 1, wherein the shielding winding layer is connected to the static terminal via a resistance, a capacitor, an inductance or a combination thereof.

8. The transformer of claim 1, wherein the number of turns of the first shielding winding is larger or smaller than that of the second shielding winding.

9. The transformer of claim 1, wherein the number of turns of the first shielding winding is equal to that of the second shielding winding.

10. The transformer of claim 1, wherein the first shielding winding and the second shielding winding are wound in cross manner or a sequential manner.

11. The transformer of claim 1, wherein at least one of the first shielding winding and the second shielding winding of the shielding winding layer is an auxiliary winding of the primary winding.

12. The transformer of claim 1, wherein at least one of the first shielding winding and the second shielding winding of the shielding winding layer is an auxiliary winding of the secondary winding.

13. The transformer of claim 1, wherein the first shielding winding or the second shielding winding of the shielding winding layer is a portion of the primary winding.

14. The transformer of claim 1, wherein the first shielding winding or the second shielding winding of the shielding winding layer is a portion of the secondary winding.

15. A power converter, comprising: a transformer of claim 1.

16. The power converter of claim 15, wherein the power converter is a forward converter or a flyback converter.

17. The power converter of claim 15, wherein the power converter is a half-bridge converter or a full-bridge converter.

* * * * *